UNITED STATES PATENT OFFICE.

EARL A. TAYLOR, OF BUFFALO, NEW YORK, ASSIGNOR TO MAXWELL MOTOR CO., INC., OF DETROIT, MICHIGAN, A CORPORATION OF DELAWARE.

ELECTRICAL WELDING PROCESS.

1,346,350.

Specification of Letters Patent.   Patented July 13, 1920.

No Drawing.   Application filed May 20, 1920. Serial No. 382,925.

*To all whom it may concern:*

Be it known that I, EARL A. TAYLOR, a citizen of the United States of America, residing at Buffalo, in the county of Erie and State of New York, have invented certain new and useful Improvements in Electrical Welding Processes, of which the following is a specification.

This invention relates to electric welding processes and the object is primarily to provide a practical welding process for filling in blow holes or sand holes in castings.

Heretofore, considerable losses have been occasioned by the lack of a satisfactory method for eliminating such imperfections as sand holes and blow holes in castings, and particularly in complex and expensive castings such as the cylinder blocks of explosive engines. Efforts to remedy such defects by known welding methods, such as acetylene and electric arc welding have met with only desultory success, because of the heating effect covering too large an area, and consequently producing expansion and contraction strains, resulting either in an immediate cracking of the over-heated portion, or the occurrence of a crack at some later period. In the present invention the heat is so localized as to avoid the production of such undue stresses.

Briefly describing the process, one lead of the welding circuit is connected to the casting to be welded and the other to an electrode formed of suitable metal for filling in the blow hole or sand hole. The edges and interior of the hole having been thoroughly cleaned, and the circuit energized by a suitable low voltage current, the operator vibrates the end of the electrode against the edges of the hole, continually changing the point of contact and maintaining each contact only for the momentary interval necessary to fuse the electrode and casting at their meeting points. Thus small portions of the material forming the electrode are successively welded to the casting without production of any appreciable arc and without any detrimental heating of the area of the casting adjacent the weld. To prevent this latter effect the successive points of contact should either be sufficiently spaced or a sufficient time interval allowed to permit a dissipation of heat. Having secured, as above described, integration of a layer of the filling-in material with the edges of the hole, a superposed layer is similarly produced, and this is repeated until finally the hole is closed and filled in somewhat above the surrounding surface of the casting. At intervals during this filling in the weld is peened down with a suitable tool to insure against porosity. Finally the weld is ground down to a level with the adjacent surface of the casting. If the described process be properly carried out, the weld can be detected only with considerable difficulty and is fully as strong and imperforate as the other portions of the casting.

It is desirable in practising the described process to use metal for the filling-in electrode characterized by a high electrical resistance, a low coefficient of expansion and a tensile strength equal to, if not greater, than that of the casting to be welded. These characteristics are found favorably combined in commercially pure nickel. Pure iron wire which has been largely used in heretofore known welding processes is unsuitable for the present purpose because of too great a susceptibility to oxidation. When a film of oxid forms on the filling-in material as it is applied, integration of the subsequent layers of the material is interfered with. Both the resistance of nickel to oxidation and its ready malleability adapt it for use in applicant's process, the latter characteristic facilitating the peening of the weld.

Another essential for success in welding of this nature is a sufficiently low voltage current, and provision for varying this voltage within certain limits. It is highly desirable, moreover, that the current supply be constant, as fluctuations thereof may so increase the heating effect as to interfere with satisfactory work. Where alternating current is available the best results may be obtained by employment of a special type of transformer, namely, a step-down low voltage single phase transformer. The necessary regulation thereof may be obtained by tapping the secondary at suitable points and providing a switch for selectively connecting these taps to the leads of the welding circuit.

The filling-in electrode may be in the form of a pencil or wire, the thickness of which will be determined within certain limits by the thickness of the work. That is to say, when the wall of the casting in which the weld is being made is quite thin, the danger of cracking is correspondingly great and a small diameter electrode must be used to avoid transmission of high temperature to too large an area. In working on thicker walls, larger diameter electrodes may be safely used. The voltage is regulated according to the size of the electrode, being decreased for the smaller electrodes and increased for the larger ones. While no definite limits may be set as to the proper voltage, successful results with various sizes of electrodes have been obtained, using voltages ranging from 4 to 30.

The described process is not to be confused with such arc welding methods as have heretofore been employed, as by virtue of the low voltage any appreciable arc is avoided, the heating effect arising from the production of a dead short circuit each time the electrode engages the work.

What I claim as my invention is:

1. A process of electric welding consisting in forming a succession of dead short circuits between the work and a filling in electrode under a voltage sufficiently low to avoid appreciable arcing, and the development of sufficient localized heat by each of said short circuits to weld a small portion of the electrode to the work.

2. A process of electric welding, for filling in defective or broken work, consisting in grounding one lead of the welding circuit to the work and the other to an electrode formed of the material for filling in, and repeatedly tapping the electrode against the work to successively weld small portions of the former to the latter until the desired thickness of metal has been built up.

3. A process of electric welding, for filling in defective or broken work, consisting in grounding one lead of the welding circuit to the work and the other to an electrode formed of the material for filling in and regulating the current and voltage to avoid an appreciable arc on making or breaking contact between the electrode and work.

4. A process of electric welding, for filling in defective or broken work, consisting in grounding one lead of the welding circuit to the work and the other to an electrode formed of a metal having a high electrical resistance, a low coefficient of expansion, and a tensile strength no less than that of the work, and repeatedly tapping the electrode against the work to successively weld small portions of the former to the latter until the desired thickness of metal has been built up.

5. A process of electric welding, for filling in defective or broken work, consisting in grounding one lead of the welding circuit to the work and the other to an electrode formed of the material for filling in, and repeatedly tapping the electrode against the work to successively weld small portions of the former to the latter until the desired thickness of metal has been built up, and peening the weld at intervals during the filling in to avoid porosity.

In testimony whereof I affix my signature.

EARL A. TAYLOR.